May 2, 1939.  T. B. MARTIN  2,156,698
VARIABLE SPEED TRANSMISSION
Filed March 27, 1937   3 Sheets-Sheet 1
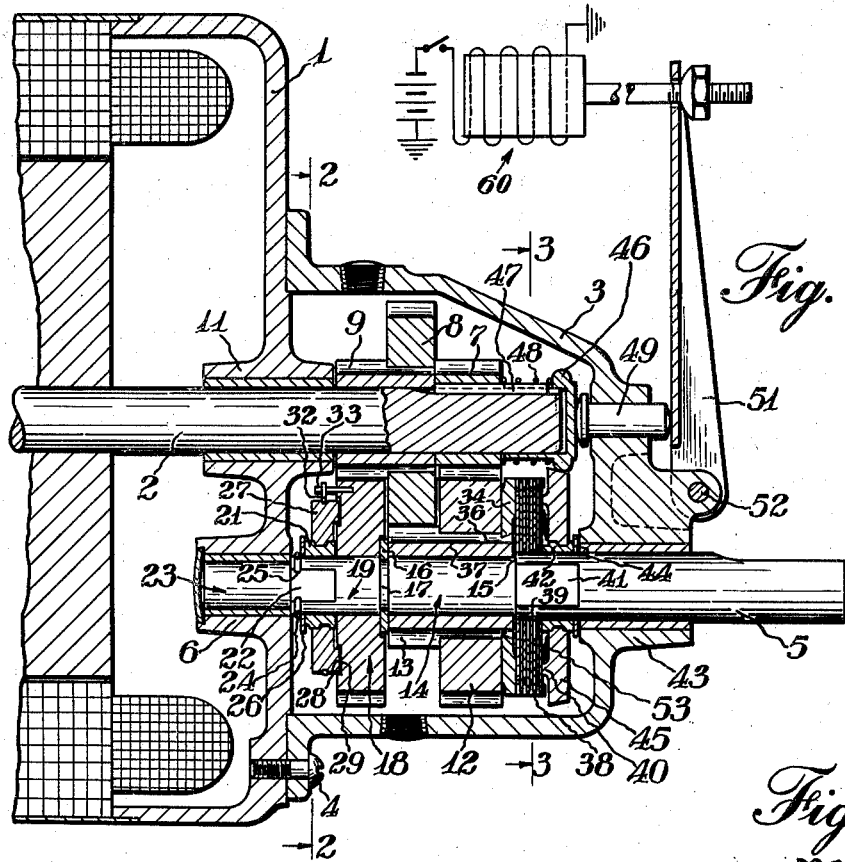
Fig. 1
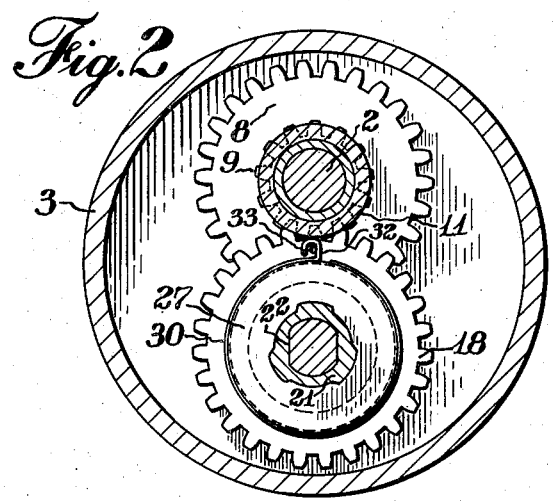
Fig. 2
Fig. 3
Witness:
Burr W. Jones
INVENTOR.
Thomas B. Martin
BY Clinton S. Janes
ATTORNEY.

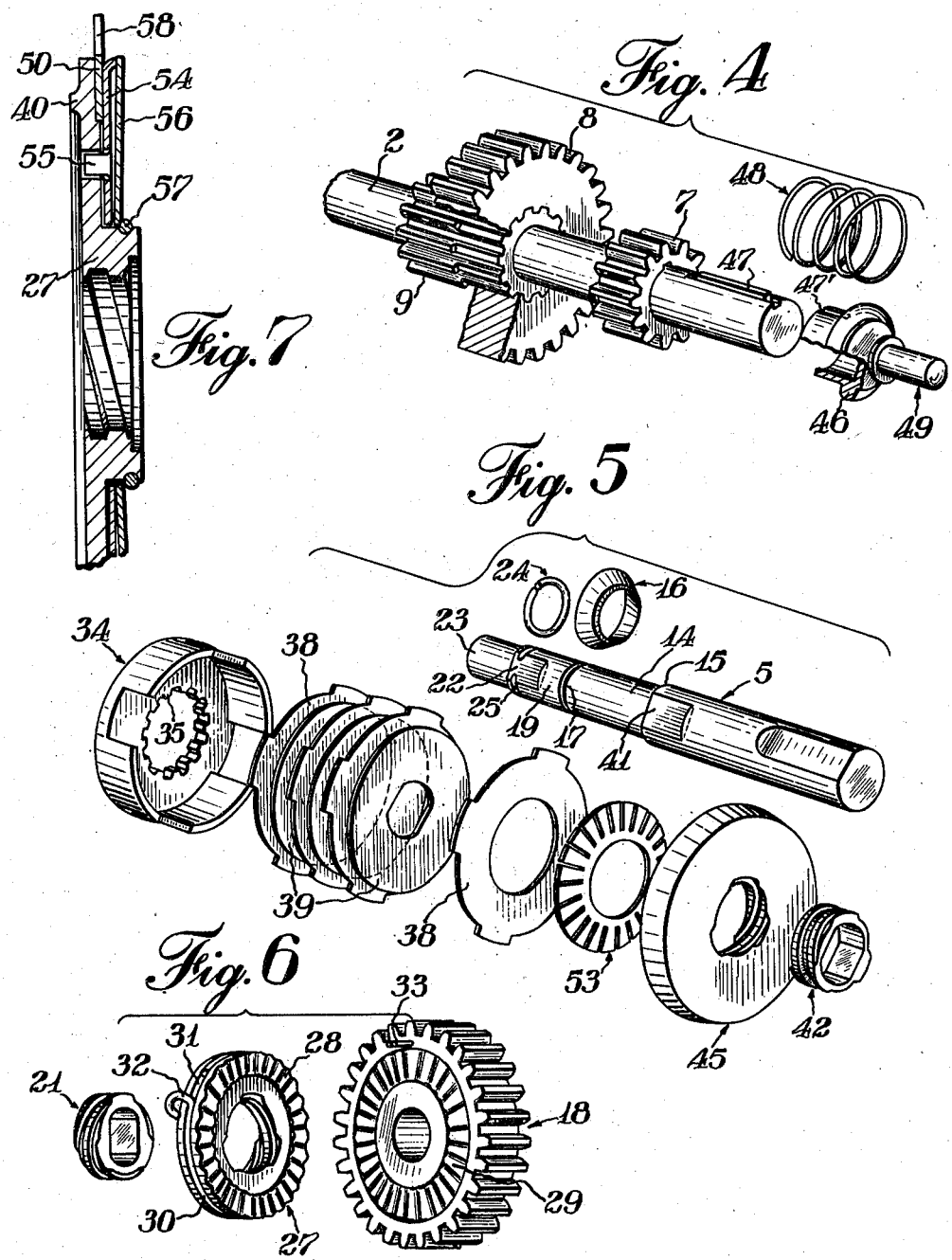

INVENTOR.
Thomas B. Martin
BY Clinton S. Janes
ATTORNEY.

Patented May 2, 1939

2,156,698

UNITED STATES PATENT OFFICE 2,156,698

VARIABLE SPEED TRANSMISSION

Thomas B. Martin, Horseheads, N. Y., assignor, by mesne assignments, to Bendix Aviation Corporation, South Bend, Ind., a corporation of Delaware Application March 27, 1937, Serial No. 133,393

15 Claims. (Cl. 74—368)

The present invention relates to a variable speed transmission and more particularly to reduction gearing optionally operable at a plurality of speed ratios.

The embodiments of the invention herein described are particularly adapted for use in conjunction with a source of power such as an electric motor for driving light machinery such as a washing machine for domestic use wherein the operation is performed at a low speed and thereafter a drying operation is performed at a high speed utilizing the principle of the centrifuge. It will be understood, however, that the invention is not limited to this particular organization.

It is an object of the present invention to provide novel variable speed gearing which is efficient and economical and embodies a simplified control system which is readily adapted for manual or automatic control.

It is another object to provide such a device incorporating a novel unitary control for the high speed gearing and an automatic control for the low speed gearing.

It is a further object to provide such a device which incorporates servo-type controlling means which are effective and reliable and operate with very small energy consumption.

Further objects and advantages will be apparent from the following description taken in connection with the accompanying drawings in which:

Fig. 1 is a vertical sectional view of a device embodying a preferred form of the invention;

Fig. 2 is a section taken substantially on the line 2—2 of Fig. 1;

Fig. 3 is a section taken substantially on the line 3—3 of Fig. 1;

Fig. 4 is a detail in perspective partly broken away showing a portion of the drive shaft with certain of the transmission elements in partially disassembled relation thereto;

Fig. 5 is a similar detail of the driven shaft with the parts of the high speed clutch and control mechanism;

Fig. 6 is a similar view of the low speed driven gear with the parts of the overrunning clutch for connecting it to the driven shaft;

Fig. 7 is a fragmentary detail in section of an optional form of clutch-controlling means;

Figure 8:
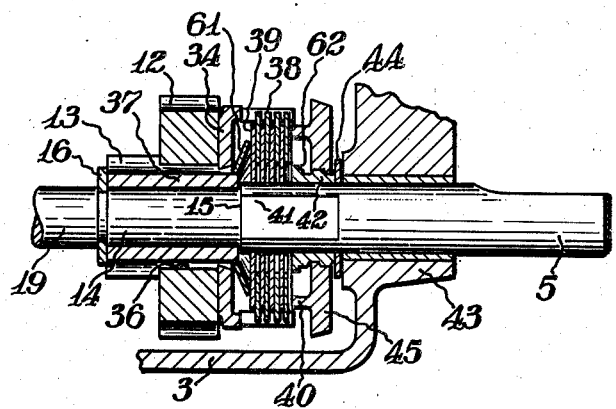
Fig. 8 is a vertical sectional detail of an embodiment of the invention incorporating a torque-limiting clutch.

Referring first to Fig. 1 of the drawings, there is illustrated at 1 a portion of a housing which may be the casing of an electrical motor as illustrated. The drive shaft 2 of the motor is extended from the housing 1 into a transmission housing 3 mounted in any suitable way as indicated at 4 on the motor housing and carrying a driven shaft 5 journalled therein, the inner end of the driven shaft being also journalled in the motor housing 1 as indicated at 6.

A drive pinion 7 is fixedly keyed on the drive shaft 2 in any suitable manner as indicated at 47, and a coupled gear and pinion 8, 9 is freely journalled on the drive shaft 2 between the drive pinion 7 and the bearing 11 for the drive shaft in the motor housing.

A coupled gear and pinion 12, 13 is freely journalled on an intermediate smooth portion 14 of the driven shaft 5, and so arranged that the gear 12 meshes with the drive pinion 7, and the pinion 13 meshes with the gear 8 journalled on the drive shaft. The longitudinal position of the gear and pinion 12, 13 on the driven shaft is defined on the one hand by a shoulder 15 on the driven shaft and on the other hand by a thrust ring 16 seated in a groove 17 in the driven shaft. This thrust ring may be a split ring sprung into the groove or may be a dished ring as indicated in Fig. 5 adapted to be forced into the groove and flattened in place.

A driven low speed gear 18 is journalled freely on a smooth portion 19 of the driven shaft, bearing at one side against the thrust ring 16. An externally threaded sleeve 21 is non-rotatably mounted on the driven shaft adjacent the gear 18 as by means of a "double-D" section formed by milling flats 22 on opposite sides of the driven shaft and providing the sleeve 21 with a bore conforming thereto. The terminal portion 23 of the driven shaft where it is journalled in the bearing 6 is reduced in diameter to permit assembly of the sleeve 21. Means for preventing axial movement of the sleeve 21 away from the gear 18 is provided in the form of a split thrust ring 24 seated in a groove 25 in the shaft, a washer 26 being preferably interposed between the sleeve and thrust ring.

An overrunning clutch connection between the gear 18 and the driven shaft is provided by means of a clutch member 27 threaded on the sleeve 21 and provided with the clutch surface 28 which is preferably serrated for engagement with a corresponding surface 29 on the side of gear 18. Means for causing the clutch member 27 to engage the gear and lock it to the shaft when the gear overruns the shaft is provided in the form of a light frictional connection between the clutch member and gear. As here shown, this frictional connection is provided by a spring wire ring 30 (Fig. 6) seated in a groove 31 in the clutch member 27 and having an outturned end 32 preferably in the form of a loop adapted to engage a pin 33 extending laterally from the side of the gear. The spring ring 30 is arranged to wrap down and grip the clutch member when the gear 18 overruns the driven shaft so as to ensure traversal of the clutch member into engagement with the gear. When the driven shaft overruns, however, the clutch member 27 is permitted to overrun freely by reason of the unwrapping action of the spring ring 30.

According to the present invention, a high speed clutch is provided for connecting the driven shaft 5 directly to the high speed gear 12, the clutch being closed by servo means actuated under the control of the operator by slippage of the clutch itself. For this purpose, a barrel member 34 is rigidly attached to the gear 12 in any suitable manner as by means of inwardly extending teeth 35 (Fig. 5) in the hub of the barrel forced into engagement with spline grooves 36 (Fig. 1) in the extended hub 37 of the pinion 13 on which gear 12 is mounted. A plurality of frictional driving clutch discs 38 are non-rotatably mounted in the barrel in alternation with a plurality of companion driven discs 39 which are non-rotatably mounted on a "double-D" section 41 of the driven shaft 5. An externally threaded sleeve 42 is also non-rotatably mounted on the same "double-D" section 41 adjacent the outermost clutch disc, being perferably spaced from the bearing 43 of the driven shaft in the transmission housing by means of a thrust washer 44.

Control means for the high speed friction clutch formed by the discs 38, 39 is provided including a control member 45 threaded on the sleeve 42 in such manner that rotation of the control member on the sleeve in the direction of drive causes the control member to compress the clutch discs in the barrel 34. In order to reduce the amount of force required to control the clutch, it is preferably constructed to incorporate self-closure or servo action. As here shown, this is accomplished by having a driving disc 38 at the top of the pack so as to be engaged by the control member 45 whereby the frictional engagement between the disc and member drags the member around and thus increases its compressive effect on the clutch discs.

It has been found that this servo action can best be secured and controlled by employing a restricted zone of contact between the driving disc and control member. Thus a ring 40 is formed on the control member 45 for engaging the disc 38. This ring is sufficiently narrow to ensure breaking down the oil film between the disc and member, but not so narrow as to tend to score and seize, and the diameter of the ring is so chosen with respect to the pitch of the thread on sleeve 42 that the desired amount of servo action is secured without making the clutch self-locking. It will be understood in this connection that an increase of the diameter of the ring increases its leverage on the control member and therefore increases the servo action.

Means under the control of the operator for actuating the control member by power derived from the drive shaft is provided in the form of a friction gear actuating member 46 splined on the end of the drive shaft by means of key 47 extending into slot 47' (Fig. 4) normally maintained out of engagement with the control member 45 as by means of a spring 48, but adapted to be moved into such engagement by manually operable means in the form of a plunger 49 slidably mounted in the transmission housing 3 and arranged to be actuated by a lever 51 pivoted at 52 to the transmission housing and adapted to be controlled by the operator of the device.

A dished spring 53 is preferably interposed between the control member 45 and the clutch discs in order to assist disengagement of the control member.

The periphery of the control member 45 is preferably tapered as illustrated in order that the friction gear 46 may engage the same gradually and thus cause the clutch to be closed with gradually increasing pressure as the gear 46 is moved longitudinally by the operator. The formation of the member 46 as a socket receiving the end of shaft 2 as shown in Figs. 1 and 4 is advantageous in that a dashpot effect is thus secured by which the longitudinal motion of the member 46 is retarded by the air or oil trapped therein, thus further assuring gradual closure of the clutch.

In the operation of the device and starting with the high speed clutch in open or relaxed position, rotation of the drive shaft 2 by the motor causes rotation of the drive pinion 7 fixed thereon, which rotation is transmitted in turn to the gear 12, pinion 13 fixed thereto, gear 8 meshing therewith, pinion 9 fixed to the gear 8 and the low speed gear 18 journalled on the driven shaft. The pin 33 on gear 18 engaging the outturned end 32 of the control spring 30 consequently causes said spring to grip the clutch member 27 and thread it along the sleeve 21 into engagement with the clutch surface 29 of gear 18. Gear 18 is thus clamped between the thrust ring 16 and the clutch member 27 and is accordingly locked to the driven shaft 5 whereby the driven shaft is operated at low speed. When this transmission is used in connection with a domestic washing machine, the low speed operation, as above set forth, is intended to actuate the machine during the washing operation when a considerable amount of load has to be overcome at a comparatively low speed.

When it is desired to operate the machine at high speed as for the drying operation of a washing machine, it is merely necessary for the operator to swing the control lever 51 to the left in Fig. 1 so as to bring the friction gear 46 into engagement with the periphery of the high speed clutch control member 45. Since at this time the driven shaft 5 is being operated at low speed, the clutch member 45 will be driven by the friction gear 46 at a higher rate of speed than the driven shaft whereby it will be threaded along the sleeve 42 and caused to engage and compress the high speed clutch discs 38, 39 as illustrated in Fig. 1. Friction between the end clutch disc 39 and the control member thereupon assists the friction gear in dragging the control member around faster than the screw sleeve 42, so that a comparatively small amount of force from the gear 46 is sufficient to cause closure of the clutch. Torque is thus transmitted directly from the gear 12 through barrel 34 and clutch discs 38, 39 to the driven shaft whereby the latter is caused to operate at high speed.

It will be noted that due to the fact that the engagement of the friction gear 46 and control member 45 takes place substantially coincident with the point of engagement of the pitch circles of pinion 7 and gear 12, the speed ratio of the friction gearing formed by members 45 and 46 is substantially the same as the speed ratio of pinion 7 and gear 12. During the high speed operation of the device, therefore, as soon as the high speed clutch is closed sufficiently to lock the driven shaft 5 to the gear 12, the friction gearing simply rolls without slippage and consequently without frictional loss except for the negligible amount of friction between the head of the plunger 49 and the friction gear 46.

The acceleration of the driven shaft 5 by closure of the high speed clutch causes the low speed clutch sleeve 21 to overrun the clutch member 27, thus causing it to be threaded back out of engagement with the gear 18, after which the driven shaft is free to overrun the gear 18 which continues to operate at low speed. The disengaging movement of the clutch member 27 is limited by the washer 26 and thrust ring 24 whereby the clutch member is caused to rotate with the driven shaft. During this time, the spring ring 30 rotates at the speed of the gear 18, but the clutch member 27 overruns the ring 30 freely since such overrunning is in a direction to unwrap and release the frictional pressure of the spring ring 30 thereon.

When it is desired to resume operation at low speed, it is merely necessary for the operator to release the lever 51, whereupon the friction gear 46 is moved by the spring 48 out of engagement with the high speed clutch control member 45 which then moves back along the sleeve 42 with the assistance of spring 53 whereby the clutch discs 38, 39 are released. The low speed clutch member 27 thereupon picks up the driven shaft 5 as previously described, and operation at low speed is automatically resumed.

It will be understood that various changes may be made in the design and arrangement of the parts without departing from the spirit of the invention as defined in the claims appended hereto. Thus as illustrated in Fig. 7, the control of the clutch member 27 may be effected by means of a friction ring 50 mounted on the periphery of the clutch member 27 and maintained in light frictional engagement therewith by means of a disc 54 non-rotatably connected to the clutch member as indicated at 55 and lightly pressed into engagement with the friction ring 50 by means of a dished spring washer 56 retained on the clutch member by means of a snap ring 57. The friction ring 50 is provided with a projection 58 adapted to engage the pin 33 of gear 18 in order to cause rotation of the friction ring in unison with the gear. It will be understood that only a very light frictional drag of the ring 50 on the clutch member 27 is required, and the dished spring washer 56 is particularly well-adapted to permit considerable latitude in dimensions of the parts without undesirably affecting the amount of frictional drag exerted by the ring 50.

It is to be understood that the control lever 51 may be actuated directly by the operator or indirectly by any suitable means such as an electrical solenoid 60 (Fig. 1) or other relay device.

Figure 9:
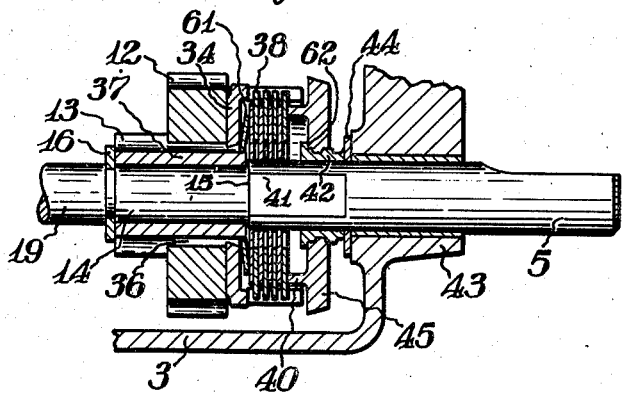
Fig. 9 is a similar view showing the parts in driving position.

In some installations it has been found desirable to limit the torque capacity of the high speed clutch in order to prevent sudden acceleration of the driven shaft and consequent overloading of the driving motor. A preferred form of structure for accomplishing this purpose is illustrated in Figs. 8 and 9.

As there shown, a spring in the form of a dished washer 61 is interposed between the clutch discs and the inner end of the barrel 34, and means for limiting the travel of the control member 45 in a direction to compress the clutch is provided in the form of a shoulder 62 on the screw sleeve 42. It will be readily appreciated that by suitably proportioning the parts including the stiffness of spring 61, the maximum torque capacity of the clutch may be predetermined, and by virtue of the flat characteristic of springs of this type, the capacity of the clutch will remain substantially constant over long periods of use.

What is claimed is:

1. In a variable speed transmission, a drive shaft, a driven shaft, low speed gearing adapted to connect said shafts including an overrunning clutch, high speed gearing adapted to connect said shafts including a disconnectable friction clutch, means operable by slippage of said latter clutch applying pressure to the frictional elements of said latter clutch to resist such slippage, and means under the control of the operator for rendering the pressure means operative or inoperative.

2. In a power transmission device, a drive shaft, a driven shaft, means adapted to connect said shafts including gearing and a disconnectable clutch, means for controlling the clutch including a gear so mounted on the driven shaft adjacent said clutch that rotation thereon in the direction of drive causes longitudinal movement of the gear thereon to engage and close the clutch, and a gear non-rotatably mounted on the drive shaft adapted to rotate the control gear at substantially the same speed ratio as the first-mentioned gearing.

3. In a power transmission device, a drive shaft, a driven shaft, means adapted to connect said shafts including gearing and a disconnectable clutch, means for controlling the clutch including a friction gear so mounted on the driven shaft adjacent said clutch that rotation thereon in the direction of drive causes longitudinal movement of the gear thereon to engage and close the clutch, and a friction gear splined on the drive shaft adapted to engage and rotate the control gear at substantially the same speed ratio as the first-mentioned gearing.

4. In a power transmission device, a drive shaft, a driven shaft, means adapted to connect said shafts including gearing and a normally disconnected friction clutch, means for controlling said clutch including a friction control gear so threaded on the driven shaft adjacent said clutch that rotation thereon in the driving direction causes longitudinal movement thereof to engage and close the clutch, a friction gear splined on the drive shaft adapted to engage and drive the control gear but normally out of engagement therewith, and manually operable means for moving the splined gear into engagement with the control gear.

5. In a variable speed transmission, a drive shaft, a driven shaft, a pinion fixed on the drive shaft, a coupled gear and pinion unit journalled on the drive shaft, a coupled gear and pinion journalled on the driven shaft and meshing respectively with the fixed pinion and the gear on the drive shaft, a second gear journalled on the driven shaft meshing with the pinion journalled on the drive shaft, means including a clutch member so mounted on the driven shaft that rotation thereon in the driving direction causes longitudinal movement thereof to clutch said second gear to the driven shaft, and a light frictional connection between the clutch member and said second gear.

6. In a variable speed transmission, a drive shaft, a driven shaft, a pinion fixed on the drive shaft, a coupled gear and pinion unit journalled on the drive shaft, a coupled gear and pinion journalled on the driven shaft and meshing respectively with the fixed pinion and the gear on the drive shaft, a second gear journalled on the driven shaft meshing with the pinion journalled on the drive shaft, means including a clutch member having a threaded connection on the driven shaft such that rotation thereon in the driving direction causes longitudinal movement thereof to clutch said second gear to the driven shaft, a light frictional connection between the clutch member and said second gear, and means on said driven shaft limiting longitudinal movement of the clutch member away from said second gear.

7. In a variable speed transmission, a drive shaft, a driven shaft, a pinion fixed on the drive shaft, a coupled gear and pinion unit journalled on the drive shaft, a coupled gear and pinion journalled on the driven shaft and meshing respectively with the fixed pinion and the gear on the drive shaft, a second gear journalled on the driven shaft meshing with the pinion journalled on the drive shaft, an overrunning clutch connection between said second gear and the driven shaft, a friction clutch adapted to connect the driven shaft to the first-mentioned gear journalled thereon, and means under the control of the operator actuated by rotation of the drive shaft to cause closure of said clutch.

8. In a power-transmitting device, a drive shaft, a driven shaft, a pinion fixed on the drive shaft, a gear journalled on the driven shaft, a barrel member fixed to said gear, friction clutch elements non-rotatably connected respectively to the barrel and driven shaft, a control member having a threaded connection with the driven shaft such that rotation thereon in the driving direction causes the control member to compress the clutch elements, and means actuated by the drive shaft for so rotating the control member.

9. In a power-transmitting device, a drive shaft, a driven shaft, a pinion fixed on the drive shaft, a gear journalled on the driven shaft, a barrel member fixed to said gear, friction clutch elements non-rotatably connected respectively to the barrel and driven shaft, a control member having a threaded connection with the driven shaft such that rotation thereon in the driving direction causes the control member to compress the clutch elements, and an actuating member non-rotatably mounted on the drive shaft and movable thereon to engage and rotate the control member.

10. In a power-transmitting device, a drive shaft, a driven shaft, a pinion fixed on the drive shaft, a gear journalled on the driven shaft, a barrel member fixed to said gear, friction clutch elements non-rotatably connected respectively to the barrel and driven shaft, a control member in the form of a friction gear having a threaded connection with the driven shaft such that rotation thereon in the driving direction causes the control member to compress the clutch elements, and a friction gear non-rotatably mounted on the drive shaft and slidable thereon to engage and drive the control member, said friction gears being adapted to engage and roll substantially on the pitch circles of the pinion and gear.

11. In a power-transmitting device, a drive shaft, a driven shaft, a pinion fixed on the drive shaft, a gear journalled on the driven shaft, a barrel member fixed to said gear, friction clutch elements non-rotatably connected respectively to the barrel and driven shaft, a control member having a threaded connection with the driven shaft such that rotation thereon in the driving direction causes the control member to engage and compress the clutch elements, the clutch element engaged by the control member being one of those non-rotatably connected to the barrel whereby said clutch element exerts a clutch-closing torque on the control member.

12. In a power-transmitting device, a drive shaft, a driven shaft, a pinion fixed on the drive shaft, a gear journalled on the driven shaft, a barrel member fixed to said gear, friction clutch elements non-rotatably connected respectively to the barrel and driven shaft, a control member having a threaded connection with the driven shaft such that rotation thereon in the driving direction causes the control member to compress the clutch elements, a yielding abutment for the clutch elements in the barrel, and means for limiting the longitudinal movement of the control member in a direction to compress the clutch.

13. In a variable speed transmission, a drive shaft, a driven shaft, low speed gearing adapted to connect said shafts including an overrunning clutch, high speed gearing adapted to connect said shafts including a normally disconnected friction clutch, means including disengageable auxiliary gear elements adapted to connect the shafts in substantially the same ratio as the high speed gearing, said means including a connection operative in response to the transmission of torque therethrough to cause closure of said friction clutch, and means under the control of the operator for engaging said auxiliary gear elements.

14. In a power transmission device, a drive shaft, a driven shaft, means adapted to connect said shafts including gearing and a disconnectable clutch, a control member threaded on the driven shaft operable by rotation thereon in the driving direction to engage and close the clutch, and means operable by the drive shaft for rotating said control member in the direction to close the clutch.

15. In a power transmission device, a drive shaft, a driven shaft, means adapted to connect said shafts including gearing and a disconnectable clutch, a control member threaded on the driven shaft operable by rotation thereon in the driving direction to engage and close the clutch, and disconnectable gearing under the control of the operator operable by the drive shaft for rotating said control member at substantially the same speed ratio as said first-mentioned gearing.

THOMAS B. MARTIN.